United States Patent

Shibayama

[11] Patent Number: 6,072,957
[45] Date of Patent: Jun. 6, 2000

[54] FLASH UNIT FOR A CAMERA

[75] Inventor: Yoshinobu Shibayama, Kawasaki, Japan

[73] Assignee: Canon Kabushiki Kaisha, Tokyo, Japan

[21] Appl. No.: 09/204,269

[22] Filed: Dec. 3, 1998

[30] Foreign Application Priority Data

Dec. 8, 1997 [JP] Japan .................................. 9-352026

[51] Int. Cl.⁷ ................................................. G03B 15/05
[52] U.S. Cl. ........................................... 396/158; 396/200
[58] Field of Search .................................. 396/157, 158, 396/200; 362/12, 11

[56] References Cited

U.S. PATENT DOCUMENTS

| | | | |
|---|---|---|---|
| 5,285,232 | 2/1994 | Taniguchi et al. | 396/158 |
| 5,471,370 | 11/1995 | Takami | 362/12 X |
| 5,631,152 | 5/1997 | Kato et al. | 396/158 |
| 5,659,818 | 8/1997 | Kaihara et al. | 396/158 |

FOREIGN PATENT DOCUMENTS 3-192234   8/1991   Japan .
3-192235   8/1991   Japan .

*Primary Examiner*—W. B. Perkey
*Attorney, Agent, or Firm*—Fitzpatrick, Cella, Harper & Scinto

[57] ABSTRACT

The present invention relates to a flash unit for a camera, or to a camera which includes such a flash unit. The flash unit includes a flash emission tube for use in flash photography, and a reflecting device (reflector) which reflects light emitted from the flash emission tube in a direction of a subject. The reflector includes a concave reflective surface surrounding at least a portion of the flash emission tube. A pre-illuminating light source used for reducing red-eye phenomenon is provided with at least a portion thereof outside the space formed between the flash emission tube and the concave reflective surface of the reflector, and a light guide is provided for guiding light emitted from the pre-illuminating light source from outside to inside of the space formed between the flash emission tube and the concave reflective surface. The flash unit also may include a reflecting device that collects light for use in flash photography and collects pre-illuminating light.

15 Claims, 4 Drawing Sheets

FLASH UNIT FOR A CAMERA

BACKGROUND OF THE INVENTION

1. Field of the Invention

The present invention relates to a flash unit for a camera, and more particularly to a flash unit that reduces red-eye phenomenon that occurs during flash photography.

2. Description of the Related Art

When a color photograph of a person is taken using an electronic flash unit, a so-called red-eye phenomenon may occur in which the eyes of the person appear bright the red in the picture. The red-eye phenomenon occurs because a flash of an electronic flash unit is reflected by capillary vessels in the retinas of the person's eyes, and the reflected light is recorded on film. The phenomenon is likely to occur in the following cases.

(1) When pupils are dilated because of a dark photographing environment.

(2) When the distance between a luminous portion of the electronic flash unit and an optical axis of a picture-taking lens is short.

It has been conventionally stated that the number of occurrences of red-eye phenomenon is high when the angle provided between the picture-taking lens and a flash emission tube that are focused on by the pupils of a subject is two degrees or less. In particular, in a so-called zoom camera capable of changing magnification, since zoom magnification has increased in recent years, the diameters of the pupils printed after photographing appear large and become more noticeable.

In order to reduce red-eye phenomenon, the distance between the picture-taking lens and the flash emitting portion may be increased. However, in a camera having a large main body, and a camera in which the flash emitting portion is accommodated in the camera and is separated from the picture-taking lens by a predetermined distance only when used, it is necessary to ensure static pressure strength and impact strength of a driving device for the flash emitting portion, thus causing an increase in the number of components and the need for increasing the rigidity of the components. For this reason, a method for electrically reducing red-eye phenomenon has been proposed. For example, a method has been proposed in which a subject is pre-illuminated by a preliminary illuminating light source just before a photograph is taken for the amount of time required to decrease the size of the pupils so as not to be noticeable. Japanese Patent Laid-Open Nos. 3-192234 and 3-192235 propose an arrangement of the above preliminary illuminating light source in the camera. In an electronic flash unit disclosed in these documents, a flash emission tube is surrounded by a reflector comprising a reflecting surface, a protector is provided in front of the reflector to form a flash emitting portion, and a pre-illuminating light source is provided in the flash emitting portion.

FIG. 4 illustrates an example of a conventional electronic flash unit. Referring to FIG. 5, there are provided a reflector 20 having a substantially semicircular (or a semi-elliptic) shape in cross section of which both sides are blocked, a flat protector 21 attached to the reflector 20 to cover the front surface of the reflector, a flash emission tube 22 provided in the inner part of the reflector 20 and fixed between the side surfaces of the reflector 20, and a pre-illuminating light source (a small incandescent lamp) 23 consisting of a lamp or the like attached to a curved surface portion in the reflector 20. According to the electronic flash unit shown in FIG. 4, the pre-illuminating light source 23 is arranged as close to a parabolic focal point of the reflector 20 as possible, whereby light from the pre-illuminating light source 23 is collected, and a subject illuminating brightness can be increased.

FIG. 6 illustrates another example of a conventional electronic flash unit. The conventional electronic flash unit comprises the reflector 20 and the flash emission tube 22 each having the same construction as that of FIG. 5 (the protector 21 is not provided). The pre-illuminating light source 23 is, however, provided on the bottom surface of the reflector 20 that is provided forward of the flash emission tube 22. This construction allows light beams of the pre-illuminating light source 23 to directly reach the subject.

SUMMARY OF THE INVENTION

According one aspect of the present invention, there is provided a flash unit for a camera, including a flash emission tube for use in flash photography, and reflecting means for reflecting light emitted from the flash emission tube in a direction of a subject. The reflecting means includes a concave reflective surface surrounding at least a portion of the flash emission tube and forming a space between the flash emission tube and the concave reflective surface. A pre-illuminating light source for reducing red-eye phenomenon, at least a portion of the pre-illuminating light source is provided outside the space formed between the concave reflective surface and the flash emission tube. A light guide is provided for guiding light emitted from the pre-illuminating light source from outside to inside the space formed between the flash emission tube and the concave reflective surface. The unit employs common reflecting devices in order to collect light for use in flash photography and to collect pre-illuminating light, so that a reduction in size of the unit, and a better illuminating state can be achieved.

According to another aspect of the invention, there is provided a camera including a camera body, and a flash unit. The flash unit includes a flash emission tube for use in flash photography and reflecting means for reflecting light emitted from the flash emission tube in a direction of a subject. The reflecting means includes a concave reflective surface surrounding at least a portion of the flash emission tube and forming a space between the flash emission tube and the concave reflective surface. A pre-illuminating light source is provided for reducing red-eye phenomenon, at least a part of the pre-illuminating light surface is provided outside the space formed between the flash emission tube and the concave reflective surface. Light guiding means is provided for guiding light emitted from the pre-illuminating light source from outside to inside of the space formed between the flash emission tube and the concave reflective surface.

Other aspects of the present invention will become apparent from the following description of the preferred embodiments with reference to the attached drawings.

DESCRIPTION OF THE PREFERRED EMBODIMENT

An embodiment of the present invention will now be described with reference to the drawings.

Figure 1:
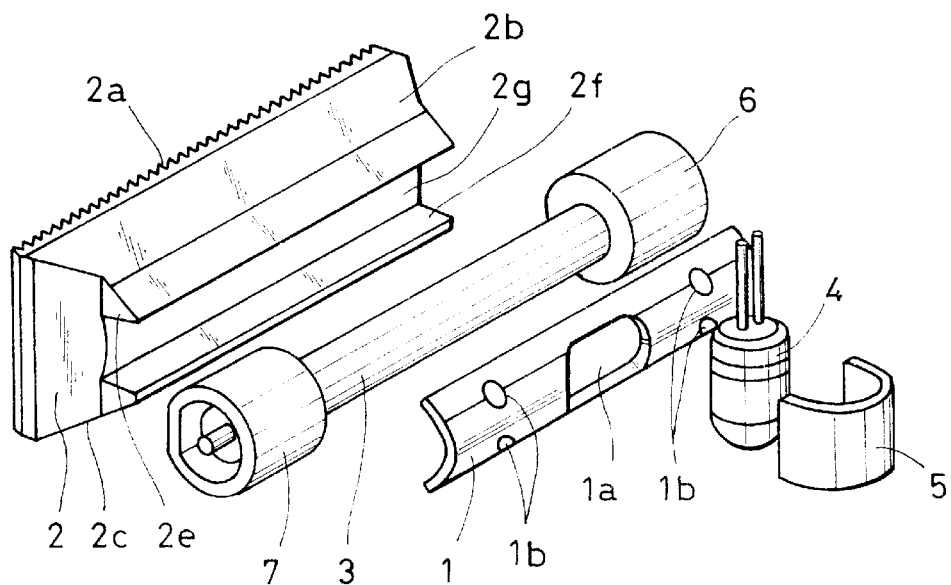
FIG. 1 is an exploded perspective view showing an electronic flash unit according to an embodiment of the present invention.
Figure 2:
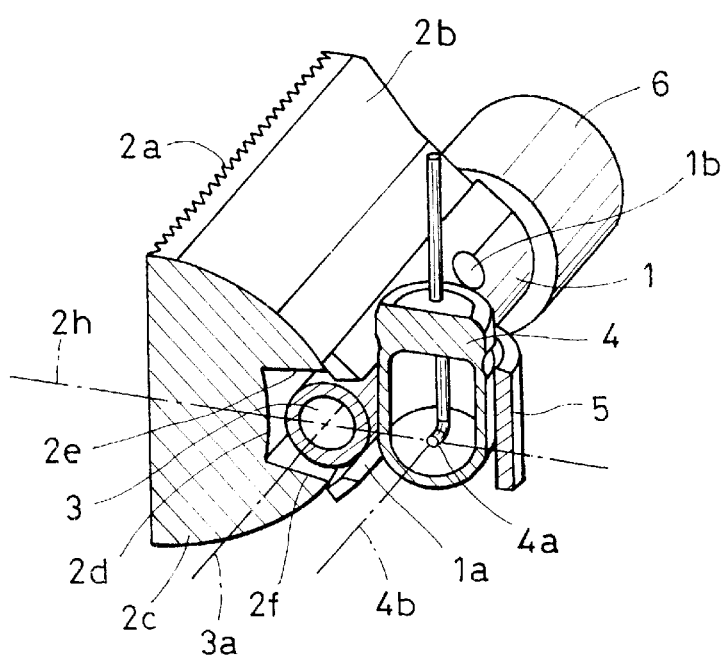
FIG. 2 is a cross-sectional view showing a state of a main part of the electronic flash unit shown in FIG. 1 after assembly.
Figure 4:
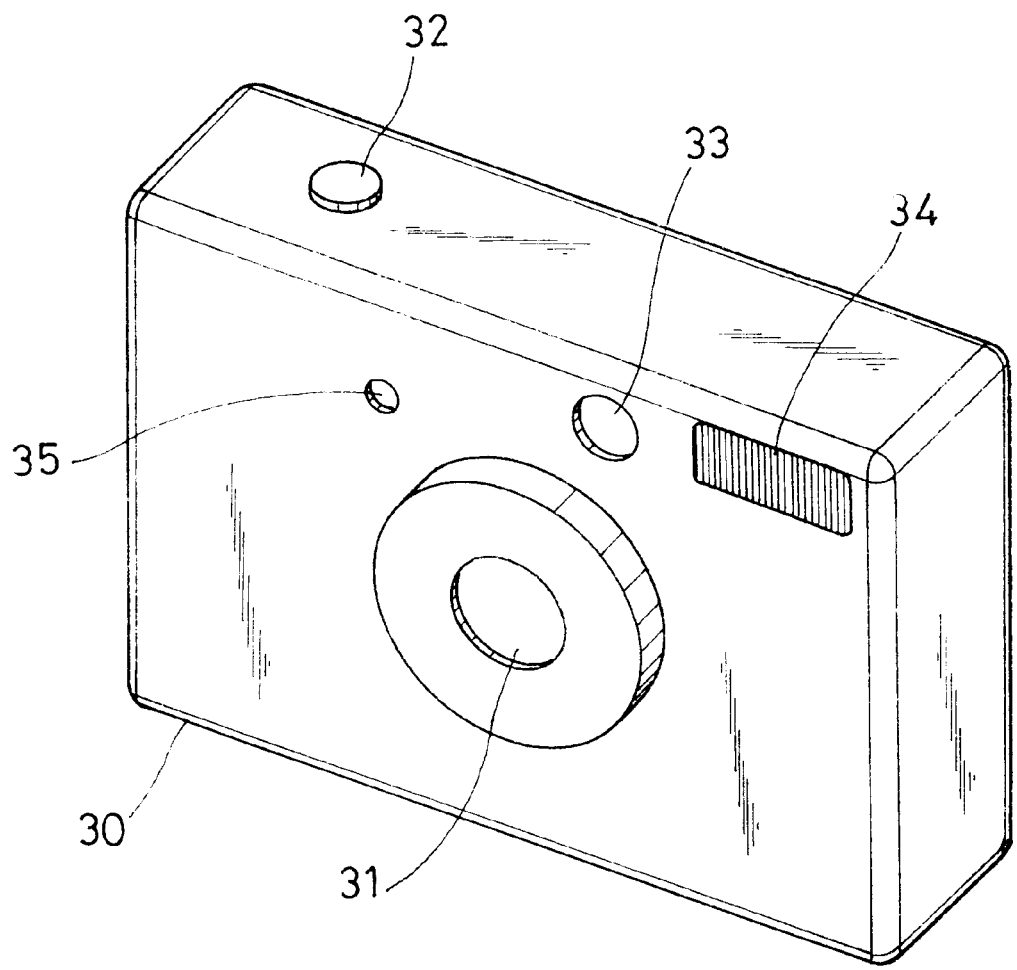
FIG. 4 is a perspective view showing the appearance of a camera to which the electronic flash unit shown in FIGS. 1 and 2 is applied.

FIG. 1 is an exploded perspective view showing an electronic flash unit adapted for a camera according to an embodiment of the present invention, and FIG. 2 is a cross-sectional view showing a state of a main part of the electronic flash unit of FIG. 1 after assembly. FIG. 4 is a perspective view showing the appearance of a camera to which the electronic flash unit shown in FIGS. 1 and 2 is applied. Referring to FIG. 4, there are provided a camera body 30, a picture-taking lens 31, a shutter release button 32, a viewfinder objective lens 33, a flash emission section 34, and a photo-metering window 35 for taking in light for photometry. The electronic flash unit shown in FIGS. 1 and 2 is arranged in the flash emission section 34.

Referring to FIGS. 1 and 2, a reflector 1 has a U-shape in cross section. An opening 1a is formed in the center of the reflector 1, and four projections 1b projecting inward are provided with one pair of projections provided at each end of the reflector 1. A Fresnel block 2 is formed by molding a transparent (or semitransparent) material, and the reflector 1 is attached to the rear thereof. The Fresnel block 2 comprises a Fresnel portion 2a for imparting light collecting ability in a lateral (longitudinal) direction, total-reflecting curved surfaces 2b and 2c for imparting light collecting ability in a vertical direction, a curved surface portion 2d for guiding light emitted from a xenon tube 3, serving as a flash emission tube, directly to a subject, and flat surface portions 2e and 2f. The curved surface portion 2d and flat surface portions 2e and 2f form a recess 2g into which the xenon tube 3 is fitted.

A pre-illuminating light source 4 consists of a lamp arranged at the opening 1a of the reflector 1, and a light source reflective plate 5 is arranged at the rear of the pre-illuminating light source 4 to project light from the pre-illuminating light source 4 to the subject. Mounting rubbers 6 and 7 fitted to respective outer ends of the xenon tube 3 prevent electrical leakage between terminals of the xenon tube 3 and the reflector 1, and function as members for holding the xenon tube 3.

A method for assembling the electronic flash unit according to the present invention will now be described with reference to FIG. 2.

The xenon tube 3 is first fitted in such a manner that it is lowered into the recess 2g of the Fresnel block 2. Then, the reflector 1 is attached from behind the xenon tube 3. In this case, the reflector 1 is attached in such a manner that the four projections 1b provided on the inner surface of the reflector 1 abut against the xenon tube 3, and a trigger voltage is applied to the surface of the xenon tube 3, whereby a light-emitting portion required for flash photography is formed. At this time, the central axis 3a of the xenon tube 3 is arranged at substantially a focal position of the curved surface of the reflector 1. The pre-illuminating light source 4 is fixed from behind the xenon tube 3 to the opening 1a of the reflector 1. In this case, a gap equal only to the amount of projection of the four projections 1 is formed between the reflector 1 and the xenon tube 3, and the pre-illuminating light source 4 is not arranged at the focal position of the reflective curved surface of the reflector 1 in the light emitting portion even if it is moved near the xenon tube 3. Therefore, the pre-illuminating light source 4 is not arranged in the light-emitting portion.

The light source reflective plate 5 is finally attached in such a manner that, of the light emitted from the pre-illuminating light source 4, light emitted to the rear of the reflector 1 or in a lateral direction is reflected to the reflector 1.

Figure 3:
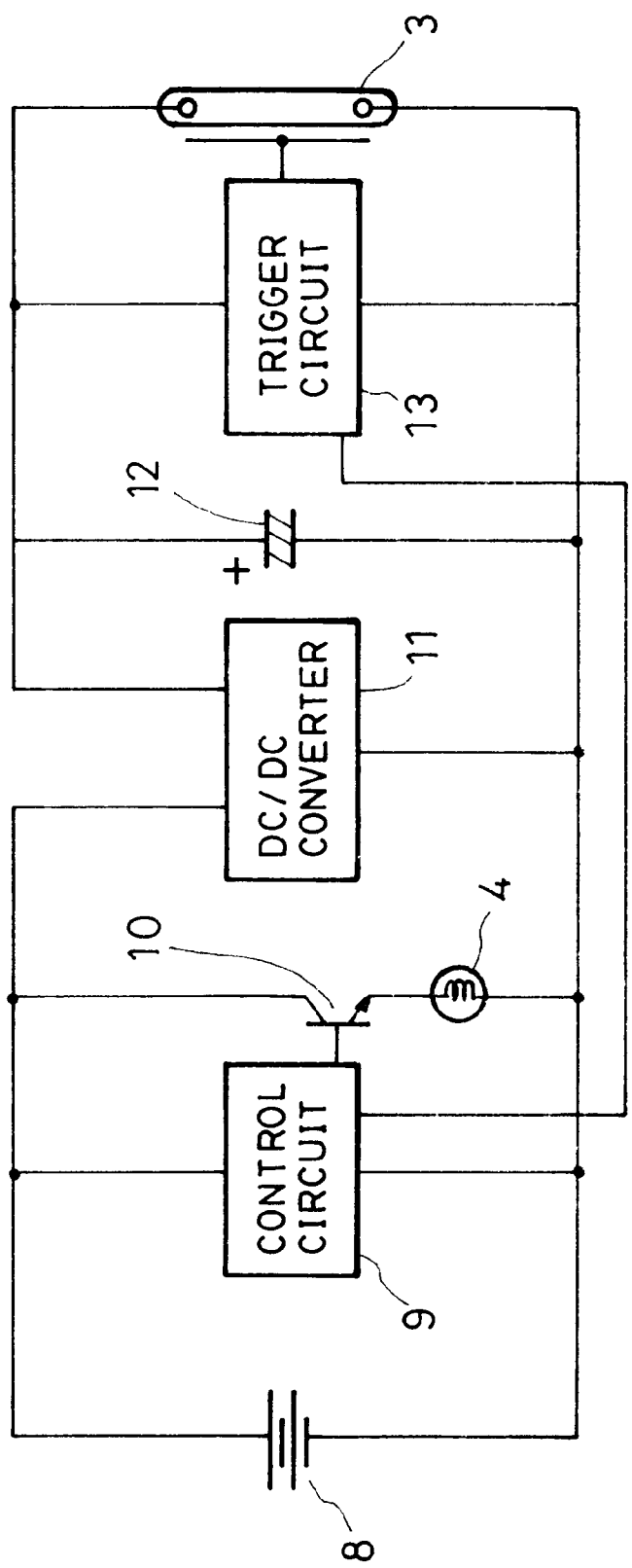
FIG. 3 is a drive circuit diagram of the electronic flash unit according to the present invention.

In a sequence of flash photography performed by a drive circuit shown in FIG. 3, the thus completed electronic flash unit emits light for a fixed time period by energizing the pre-illuminating light source 4 immediately before a shutter-releasing operation and a flashing operation of a photographing optical system (not shown) are performed. At this time, an electrode 4a of the pre-illuminating light source 4 is substantially parallel to an electrode central axis 4b. The central axis 3a of the xenon tube 3 is parallel to the electrode central axis 4b. A central axis 2h of the Fresnel block 2, the center of the xenon tube 3, and the center of the electrode 4a are arranged on the same axis.

Therefore, the light emitted from the electrode 4a is directly incident on the opening 1a with efficiency, or is indirectly reflected by the light source reflective plate 5 to pass through the opening 1a and is transmitted by the xenon tube 3, and is reflected and collected from the curved surface portion 2d of the recess 2g of the Fresnel block 2 and flat surface portions 2e and 2f to the total-reflecting curved surfaces 2b and 2c so as to illuminate the subject for a fixed time period from the Fresnel portion 2a. Thereafter, the xenon tube 3 flashes to perform flash photography.

The Fresnel block 2 may be formed into either a shape in which light is collected laterally, or a shape in which light is collected vertically by the reflector 1.

As described above, the xenon tube 3 is fitted into the recess 2g formed behind the Fresnel block 2, a part of the xenon tube 3 exposed from the recess 2g is covered with the reflector 1, the pre-illuminating light source 4 is attached to a part of the reflector 1, and the pre-illuminating light source 4 is covered with the light source reflective plate 5 so as to reflect light emitted from the pre-illuminating light source 4. This arrangement allows a projection area of the whole camera to be reduced in size.

Referring to the circuit diagram shown in FIG. 3, there are provided a battery 8 as a power source, a control circuit 9 for the camera, a transistor 10 for actuating the pre-illuminating light source 4, a DC-DC converter 11 for raising the voltage of the battery 8 up to a voltage capable of causing the xenon tube 3 to flash, a main capacitor 12 having a large capacitance for maintaining drive voltage for causing the xenon tube 3 to flash, and a trigger circuit 13 for applying the voltage of the main capacitor 12 across the xenon tube 3 at a predetermined timing and voltage-application time.

The transistor 10 is connected to the pre-illuminating light source 4 by an emitter thereof, is connected to the positive side of the battery 8 by a collector thereof, and is connected to the control circuit 9 by the base thereof. When an output voltage is generated in the control circuit 9, the transistor 10 is turned on, and an emitter current flows so as to light up the pre-illuminating light source 4. On the other hand, when the DC-DC converter 11 is actuated, high direct voltage of several kV is applied to the main capacitor 12 and the xenon tube 3. When receiving a flash operation command from the control circuit 9, the trigger circuit 13 applies a trigger voltage to a trigger electrode 3a of the xenon tube 3 to cause the xenon tube 3 to flash. In this case, since the pre-illuminating light source 4 is mounted near the rear of the reflector 1, even if the trigger voltage of several kV applied across the xenon tube 3 is induced to the pre-illuminating light source 4, it is possible to dissipate the electric charges to ground via the low impedance pre-illuminating light source 4, and thereby to prevent breakage of other elements of the camera.

As described above, according to this embodiment of the present invention, the flash unit includes a Fresnel block having a recess for fitting therein a flash emission tube formed at the rear thereof and total-reflecting surfaces for reflecting light from the flash emission tube to a subject, a reflector attached to the recess of the block in such a manner as to cover exposed surfaces of the flash emission tube and having an opening for providing a pre-illuminating light source, and a light source reflective plate for reflecting light from the pre-illuminating light source towards the opening. Therefore, the pre-illuminating light source can be arranged near the flash emission tube after the flash emission tube is arranged at a focal point location of the reflector, and the distance between the front of the reflector and the flash emission tube can be shortened, so that a reduction in size of the flash unit can be achieved.

In addition, according to this embodiment of the present invention, the Fresnel block is formed into a semi-cylindrical shape by resin molding. Therefore, the flash emission tube easily can be attached to the Fresnel block, thereby making it possible to increase mass productivity, and to pre-illuminate the subject with high brightness.

Furthermore, according to this embodiment of the present invention, the Fresnel portion 2a for scattering or diffusing light and the block are integrally formed. Therefore, it is not necessary to provide separately a protector that is used also as the Fresnel portion.

In addition, according to this embodiment of the present invention, the electrode of the flash emission tube and the pre-illuminating light source are arranged on the central axis of the block. Therefore, the subject can be efficiently illuminated, and illumination variations caused in the light to the subject can be prevented.

Furthermore, according to this embodiment of the present invention, electrical insulating members are fitted to the electrodes of the flash emission tube. Therefore, it is possible to prevent current leakage from the electrodes to the outside, and to achieve improvement in safety.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well known in the camera arts and their specific construction and operation are not critical to the operation or best mode for carrying out the invention.

In addition, according to the present invention, each of the embodiments as described above, or technical elements thereof may be combined, if necessary.

Furthermore, it may be possible for all or part of the construction of the claims or the embodiments of the present invention to make one apparatus, to be combined with another apparatus, and to become components constituting an apparatus.

In addition, the present invention is applicable to various types of cameras, such as a single-lens reflex camera, a lens shutter camera and the like. The present invention is also applicable to optical instruments and other apparatuses other than cameras, and further, to an apparatus to be applied to those cameras, optical instruments and other apparatuses or components thereof.

What is claimed is:

1. A flash unit for a camera, comprising:
   a flash emission tube;
   reflecting means for reflecting light emitted from said flash emission tube in a direction of a subject, said reflecting means including a concave reflective surface surrounding a portion of said flash emission tube and forming a space between said flash emission tube and said concave reflective surface;
   a pre-illuminating light source, at least a portion of said pre-illuminating light source being disposed outside the space formed between said flash emission tube and said concave reflective surface; and
   light guiding means for guiding light emitted from said pre-illuminating light source from outside to inside of the space formed between said flash emission tube and said concave reflective surface.

2. A flash unit according to claim 1, wherein said light guiding means includes an opening that forms a passage from the outside the space formed between said flash emission tube and said concave reflective surface to the space formed between said flash emission tube and said concave reflective surface, and means for guiding light emitted from said pre-illuminating light source into the space formed between said flash emission tube and said concave reflective surface via the opening.

3. A flash unit according to claim 1, wherein said light guiding means includes means for reflecting light emitted from said pre-illuminating light source into the space formed between said flash emission tube and said concave reflective surface.

4. A flash unit according to claim 2, wherein said opening is provided in said concave reflective surface.

5. A flash unit according to claim 3, wherein said light guiding means includes a recessed portion that covers said pre-illuminating light source, and a reflecting portion provided in said recessed portion.

6. A flash unit according to claim 2, wherein said pre-illuminating light source includes means for arranging the pre-illuminating light source adjacent to the opening.

7. A flash unit according to claim 2, wherein said pre-illuminating light source includes means for arranging said pre-illuminating light source on a straight line connecting said flash emission tube and said opening.

8. A flash unit according to claim 2, wherein the opening in said light guiding means is provided on a side of said flash emission tube opposite the subject.

9. A flash unit according to claim 1, wherein said pre-illuminating light source is provided on a side of said reflecting means opposite the subject.

10. A flash unit according to claim 1, wherein said flash emission tube and said pre-illuminating light source are provided side-by-side along the direction of a center of illumination of the flash unit.

11. A flash unit according to claim 1, further comprising means for collecting light on a side of said flash emission tube near the subject.

12. A flash unit according to claim 11, wherein said light collecting means includes a Fresnel lens.

13. A camera, comprising:

a camera body; and a flash unit, the flash unit comprising:

a flash emission tube;

reflecting means for reflecting light emitted from said flash emission tube in a direction of a subject, said reflecting means including a concave reflective surface surrounding at least a portion of said flash emission tube and forming a space between said flash emission tube and said concave reflective surface;

a pre-illuminating light source, at least a portion of said pre-illuminating light source being disposed outside the space formed between said flash emission tube and said concave reflective surface; and light guiding means for guiding light emitted from said pre-illuminating light source from outside to inside of the space formed between said flash emission tube and said concave reflective surface.

14. A flash unit for a camera, comprising:

a flash emission tube;

a reflector including a concave reflective surface surrounding a portion of said flash emission tube and forming a space between said flash emission tube and said concave reflective surface;

a pre-illuminating light source, at least a portion of said pre-illuminating light source being disposed outside the space formed between said flash emission tube and said concave reflective surface; and a light guide disposed substantially outside the opening of said concave reflective surface and surrounding at least said portion of said pre-illuminating light source disposed outside the space formed between said flash emission tube and said concave reflective surface, said light guide having a reflective surface that guides light emitted from said pre-illuminating light source from outside to inside of the space formed between said flash emission tube and said concave reflective surface.

15. A camera, comprising:

a camera body; and a flash unit, the flash unit comprising:

a flash emission tube;

a reflector including a concave reflective surface surrounding a portion of said flash emission tube and forming a space between said flash emission tube and said concave reflective surface;

a pre-illuminating light source, at least a portion of said pre-illuminating light source being disposed outside the space formed between said flash emission tube and said concave reflective surface; and a light guide disposed substantially outside the opening of said concave reflective surface and surrounding at least said portion of said pre-illuminating light source disposed outside the space formed between said flash emission tube and said concave reflective surface, said light guide having a reflective surface that guides light emitted from said pre-illuminating light source from outside to inside of the space formed between said flash emission tube and said concave reflective surface.

* * * * *

UNITED STATES PATENT AND TRADEMARK OFFICE
CERTIFICATE OF CORRECTION

PATENT NO. : 6,072,957

DATED : June 6, 2000

INVENTOR(S) : YOSHINOBU SHIBAYAMA

Figure 5:
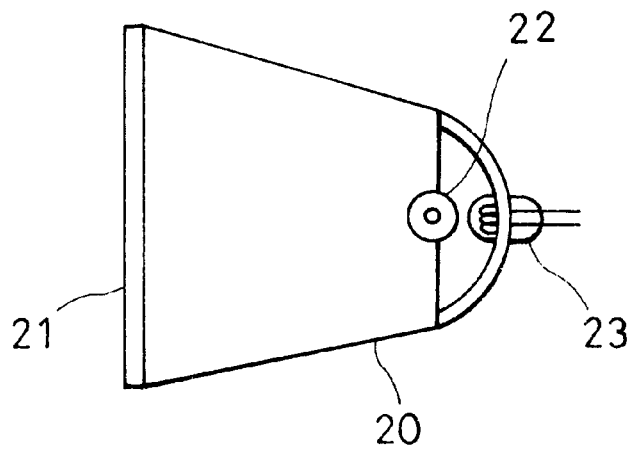
FIG. 5 is a side view showing a schematic construction of a conventional electronic flash unit.
Figure 6:
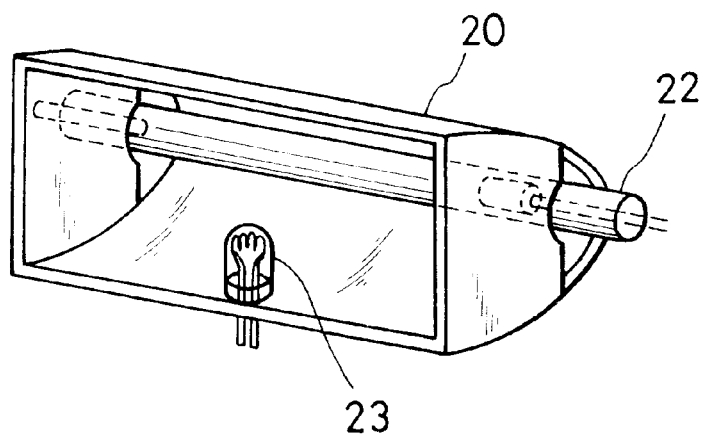
FIG. 6 is a perspective view showing a schematic construction of another conventional flash unit.

It is certified that error appears in the above-identified patent and that said Letters Patent is hereby corrected as shown below:

Column 1
    Line 12, "bright the red" should read --bright red--.
    Line 58, "FIG. 5," should read --FIG. 4--.

Column 2
    Line 17, "According" should read --According to--.
    Line 26, "phenomenon,at" should read --phenomenon, and at--.
    Line 46, "phenomenon,at" should read --phenomenon, and at--.

Column 6
    Line 30, "the outside" should read --outside--.

Signed and Sealed this

Seventeenth Day of April, 2001

Attest:

NICHOLAS P. GODICI

Attesting Officer      Acting Director of the United States Patent and Trademark Office